(12) United States Patent
Benhanokh et al.

(10) Patent No.: US 8,006,052 B1
(45) Date of Patent: Aug. 23, 2011

(54) SYSTEMS AND METHODS FOR TRACKING PORTIONS OF A LOGICAL VOLUME THAT HAVE NEVER BEEN WRITTEN BY A HOST

(75) Inventors: Zvi Gabriel Benhanokh, Brookline, MA (US); Michael J. Scharland, Franklin, MA (US); Ran Margalit, Providence, RI (US)

(73) Assignee: EMC Corporation, Hopkinton, MA (US)

( * ) Notice: Subject to any disclaimer, the term of this patent is extended or adjusted under 35 U.S.C. 154(b) by 642 days.

(21) Appl. No.: 11/487,439

(22) Filed: Jul. 17, 2006

(51) Int. Cl.
*G06F 12/00* (2006.01)
*G06F 11/00* (2006.01)
*G06F 17/30* (2006.01)

(52) U.S. Cl. ............ 711/162; 711/145; 707/999.204; 714/6

(58) Field of Classification Search ............ 711/162, 711/145; 707/204, 999.204; 714/6
See application file for complete search history.

(56) References Cited

U.S. PATENT DOCUMENTS

| | | | | |
|---|---|---|---|---|
| 6,574,709 B1 * | 6/2003 | Skazinski et al. | | 711/119 |
| 7,149,859 B2 * | 12/2006 | Fujibayashi | | 711/162 |
| 2005/0071589 A1 * | 3/2005 | Tross et al. | | 711/162 |
| 2005/0091391 A1 * | 4/2005 | Burton et al. | | 709/230 |
| 2006/0253670 A1 * | 11/2006 | Zohar et al. | | 711/162 |
| 2006/0253681 A1 * | 11/2006 | Zohar et al. | | 711/172 |
| 2006/0253683 A1 * | 11/2006 | Zohar et al. | | 711/173 |

* cited by examiner

*Primary Examiner* — Kevin L Ellis
*Assistant Examiner* — Mehdi Namazi
(74) *Attorney, Agent, or Firm* — Muirhead and Saturnelli, LLC (57) ABSTRACT

Embodiments of the invention exploit the fact that not all portions of a logical volume may include data written by a host. Accordingly, an embodiment of the invention includes setting a designated set of bits to 1 in a meta data table when a logical volume is initialized. These bits may be referred to herein as Never Written by Host (NWBH) bits. Separately, or in combination, an embodiment of the invention includes setting a NWBH bit to 0 when data is written to the associated portion of the logical volume. Separately, or in combination, an embodiment of the invention includes reading the NWBH bit upon receiving a read command associated with the associated portion of the logical volume. If the NWBH bit is equal to 1, data is not read from the associated portion of the logical volume; if the NWBH bit is equal to 0, data is read from the associated portion of the logical volume.

24 Claims, 9 Drawing Sheets

| 0 | 1 | 2 | 3 | 4 | 5 | 6 | 7 | 8 | 9 | 10 | 11 | ... |
|---|---|---|---|---|---|---|---|---|---|----|----|-----|
| 1 | 0 | 0 | 1 | 1 | 0 | 1 | 1 | 1 | 0 |    |    | ... |
| NWBH | WP | V | C | MM | MM | MM | MM | CRC | CRC | CRC | CRC | ... |

405 — (row 1)  
410 — (row 2)  
415 — (row 3)

SYSTEMS AND METHODS FOR TRACKING PORTIONS OF A LOGICAL VOLUME THAT HAVE NEVER BEEN WRITTEN BY A HOST

BACKGROUND

This disclosure relates generally to data storage systems, and more particularly, but without limitation, to the use of meta data to decrease time associated with reading data from data storage systems.

Many data storage systems include mirroring or similar utilities for copying one logical volume to another. A logical volume may be copied, for instance, during routine backup (a.k.a. snap-shot) operations. A logical volume may also be copied when hardware is replaced, for example when a disk drive is replaced with a disk drive having a larger storage capacity. Moreover, a logical volume may be copied to redistribute data from failed or failing hardware, for instance in a Redundant Array of Independent Disks (RAID) configuration. Such mirroring or similar utilities may be invoked on a manual or automatic basis.

Figure 1:
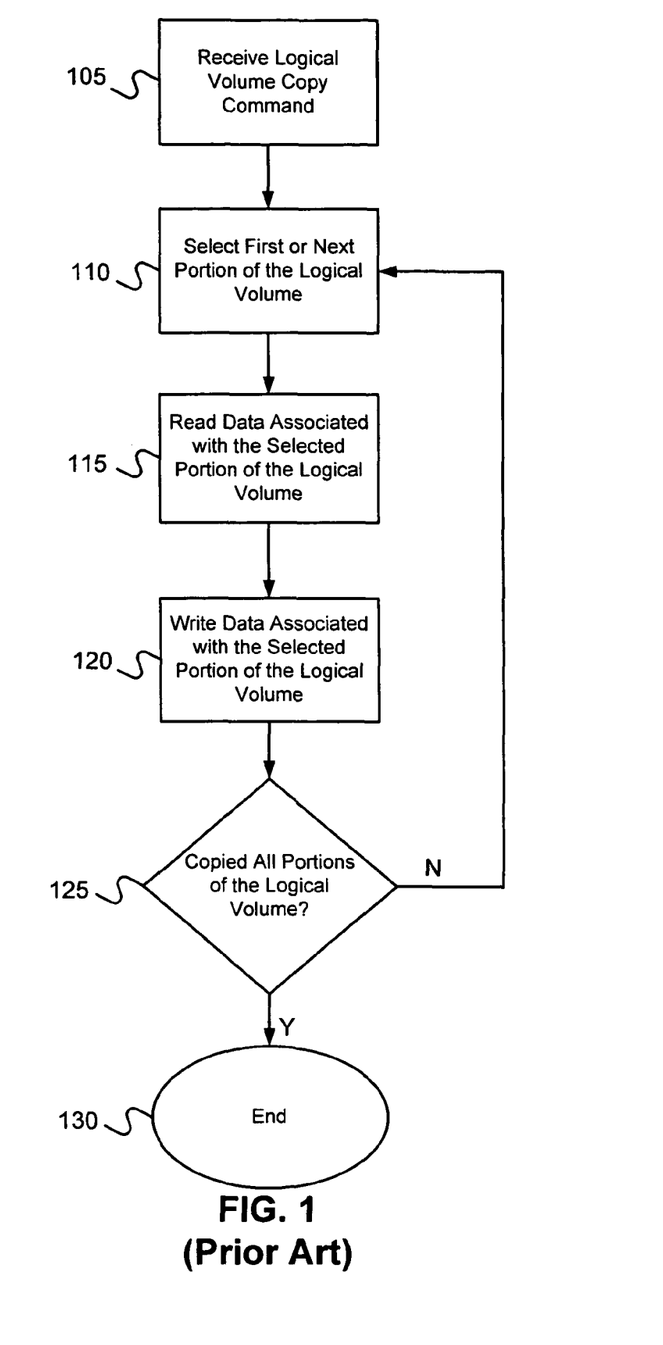
FIG. 1 is a flow diagram of a logical volume copy process, according to the prior art.

FIG. 1 is a flow diagram of a logical volume copy process, according to the prior art. A copy is essentially a read followed by a write. As indicated therein, the process begins in a step 105 by receiving a logical volume copy command. Next, in step 110, the process selects a first portion of the logical volume. Then, in step 115, the process reads data associated with the selected portion of the logical volume. Next, in step 120, the process writes data associated with the selected portion of the logical volume. Then, in conditional step 125, the process determines whether all portions of the logical volume have been copied. Where the result of conditional step 125 is in the negative, the process returns to step 110 to select a next portion of the logical volume. Where the result of conditional step 125 is in the affirmative, the process terminates in step 130.

Known systems and methods for mirroring or copying data have many disadvantages, however. For instance, in enterprise class data storage systems that contain large amount of data, known copying schemes may require hours or days to complete. Such lengthy copying consumes limited resources during data back-up operations. In addition, lengthy copying adversely affects the Mean Time to Repair (MTTR) and/or may risk data loss in instances of hardware failure. Moreover, known copying schemes may require impractical amounts of time to upgrade a data storage system.

SUMMARY OF EXEMPLARY EMBODIMENTS

Methods and systems are disclosed that use meta data to reduce the time associated with copying a logical volume. Embodiments of the invention exploit the fact that not all portions of a logical volume may include data written by a host. Logical and physical groupings may align, according to design choice; for example a portion of a logical volume may be aligned with a track on a disk drive.

An embodiment of the invention includes setting designated bits to 1 in meta data when a logical volume is initialized. These bits may be referred to herein as Never Written by Host (NWBH) bits. Separately, or in combination, an embodiment of the invention includes setting a NWBH bit to 0 when data is written to the associated portion of the logical volume. Separately, or in combination, an embodiment of the invention includes reading the NWBH bit upon receiving a read command related to the associated portion of the logical volume. If the NWBH bit is equal to 1, data is not read from the associated portion of the logical volume; if the NWBH bit is equal to 0, data is read from the associated portion of the logical volume.

One embodiment consistent with features and principles of the invention is a method for initializing a logical volume. The method includes selecting a portion of the logical volume; and setting a bit in a meta data table, the bit associated with the selected portion, the bit setting indicating that a host has not written data to the selected portion.

Another embodiment consistent with principles of the invention is a method for writing data to a logical volume. The method includes receiving a write command from a host; selecting a portion of the logical volume associated with the write command; writing the data to the selected portion; and setting a bit in a meta data table, the bit associated with the selected portion, the bit setting indicating that the host has written the data to the selected portion.

Another embodiment consistent with principles of the invention is a method for reading a logical volume. The method includes receiving a read command; selecting a portion of the logical volume associated with the read command; determining whether a bit in a meta data table has been set to a predetermined state, the bit associated with the selected portion; and, if the bit has been set to the predetermined state, reading the data from the portion of the logical volume.

Another embodiment consistent with principles of the invention is a method for copying a logical volume. The method includes receiving a logical volume copy command; selecting a portion of the logical volume associated with the logical volume copy command; and determining whether a first bit in a meta data table is in a first predetermined state, the first bit associated with the selected portion, the first predetermined state indicating that a host has not written data to the selected portion of the logical volume.

Another embodiment consistent with principles of the invention is a method for read-ahead processing. The method includes: selecting a first portion of a read-ahead window, the read-ahead window describing a memory portion; determining whether a meta data bit is in a predetermined state, the meta data bit associated with the selected first portion of the read-ahead window, the predetermined state indicating that a host has not written data to the selected first portion of the read-ahead window; and if the meta data bit is in the predetermined state, selecting a second portion of the read-ahead window.

Embodiments of the invention also provide systems that are configured to perform one or more of the foregoing methods. Moreover, embodiments of the invention provide processor-executable code stored on processor-readable medium, the processor-executable code configured to perform one or more of the foregoing methods.

Additional embodiments consistent with features and principles of the invention are set forth in the detailed description which follows or may be learned by practice of methods or use of systems or articles of manufacture disclosed herein. The foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings.

Figure 2:
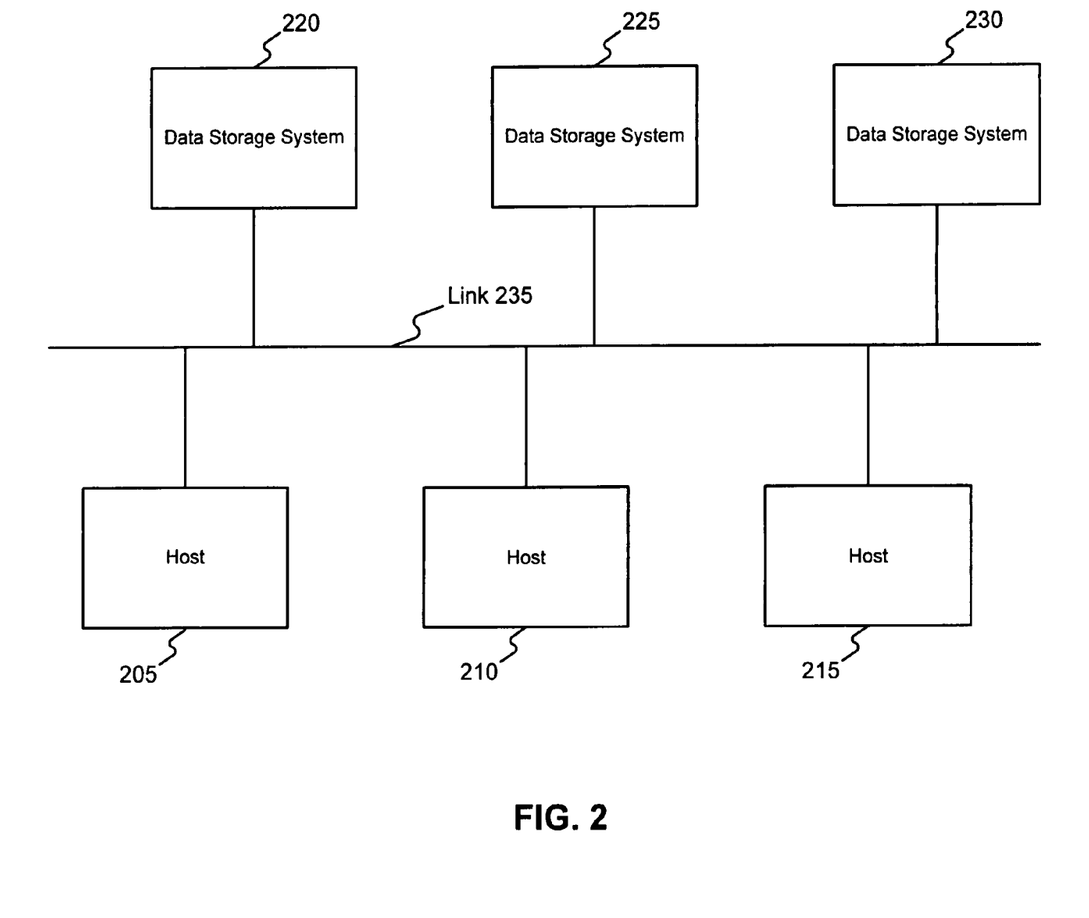
FIG. 2 is a block diagram of a functional architecture for an enterprise system, according to an embodiment of the invention.

FIG. 2 is a block diagram of a functional architecture for an enterprise system, according to an embodiment of the invention. As shown therein, hosts 205, 210, and 215, are coupled to each of data storage systems 220, 225, and 230, via link 235. Link 235 may be or include the Internet, an intranet, a wired link, a wireless link, or other link, and may utilize Transmission Control Protocol/Internet Protocol (TCP/IP), Small Computer System Interface (SCSI), Fibre Channel, or other communications protocol. Link 235 may also represent a plurality of links of the same or different types; all or a portion of these links may be redundant. Any host can access data in any one or more data storage systems, and data may be transferred between data storage systems.

Variations to the architecture illustrated in FIG. 2 are possible. For example, the number of hosts need not equal the number of data storage systems. And there is no theoretical limit to the number of either type of functional component.

Figure 3:
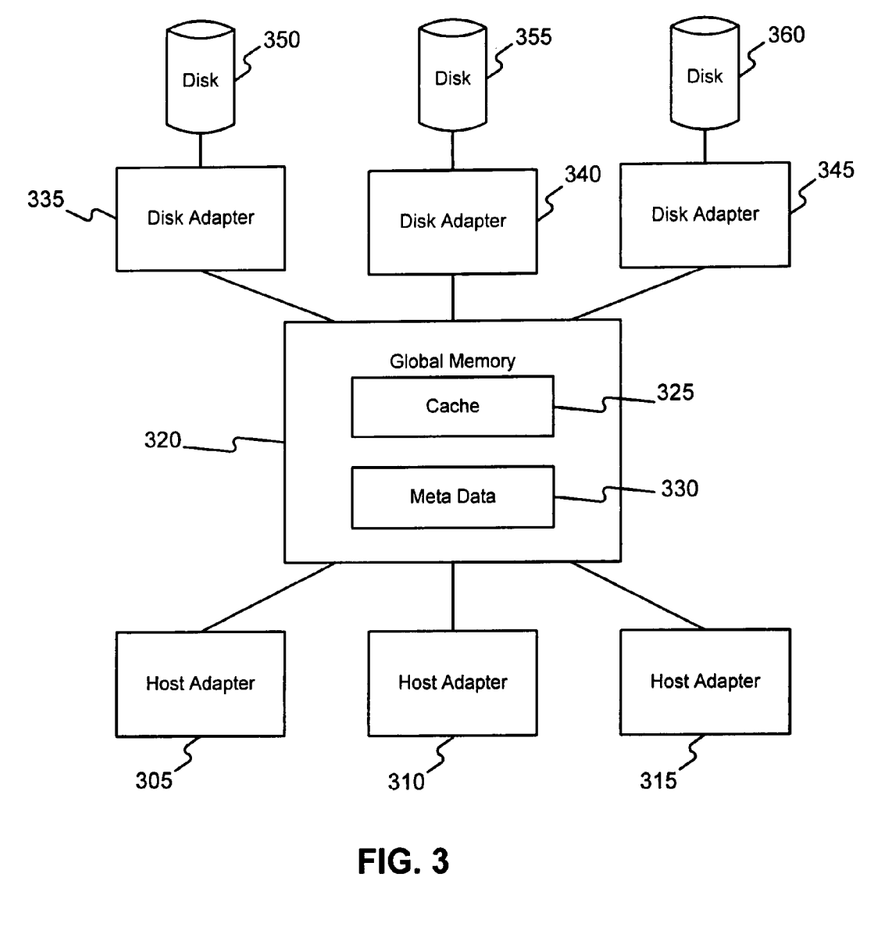
FIG. 3 is a block diagram of a functional architecture of a data storage system in an enterprise system, according to an embodiment of the invention.

FIG. 3 is a block diagram of a functional architecture of a data storage system in an enterprise, according to an embodiment of the invention. The block diagram illustrated in FIG. 3 represents an exemplary embodiment of any one or more of data storage systems 220, 225, and 230. As illustrated in FIG. 3, host adapters 305, 310, and 315 are coupled to a global memory 320. One or more of the host adapters 305, 310, and 315 may be or include, for example, a fibre channel adapter. Each of the disk adapters 335, 340, and 345 are coupled to the global memory 320. Each of data storage disks 350, 355, and 360 are coupled to a corresponding one of the disk adapters 335, 340, and 345. As also illustrated in FIG. 3, the global memory 320 may include a cache 325 and meta data 330. The cache 325 is a cache memory for relatively temporary data storage and relatively quick access as compared to the operation of disks 350, 355, and 360. The meta data 330 may include information about data stored in disks 350, 355, and 360. Meta data 330 may be a table that is indexed, for example, by track or other portion of a logical volume.

In operation, the host adapters 305, 310, and 315 provide a communication interface for any one or more of host systems 205, 210, and 215. Each of the disk adapters 335, 340, and 345 control data read and write operations associated with corresponding disk storage devices 350, 355, and 360. Each of the disk adapters 335, 340, and 345 may also enable communications between a corresponding disk and the global memory 320. The cache 325 may facilitate data transfer between any one of the host adapters 305, 310, and 315, and any one of the disk adapters 335, 340, and 345. In addition, to the extent that data residing in disks 350, 355, and 360 may be transferred between disks, the cache 325 may facilitate such disk-to-disk data transfer.

Variations to the architecture illustrated in FIG. 3 are possible. For example, each one or more of the disk adapters 335, 340, and 345 may manage read and write operations associated with more than a single disk. Moreover, any one or more disks associated with a disk adapter may be considered a logical volume, although the term logical volume is not intended to be limited by this example.

Figure 4:
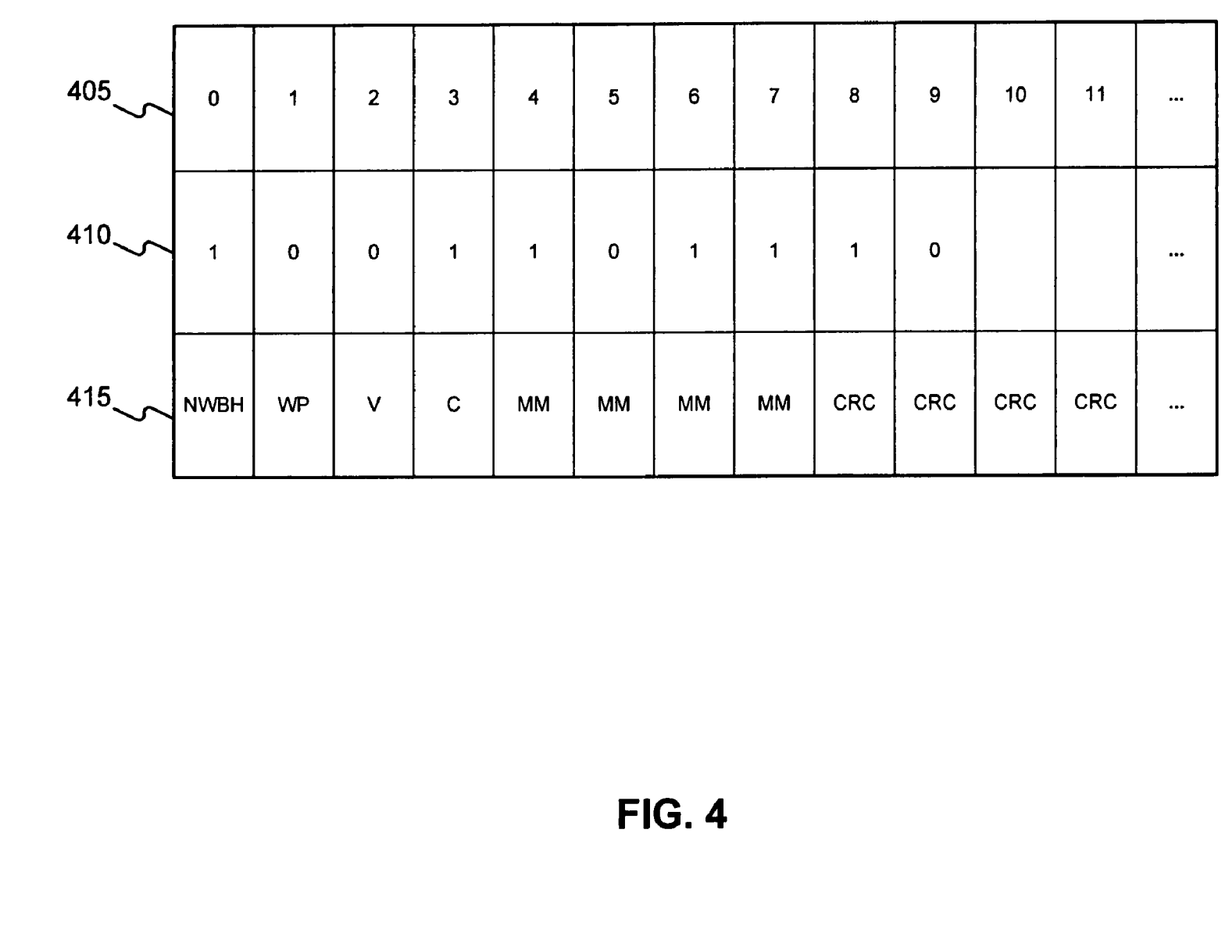
FIG. 4 is an illustration of a meta data table, according to an embodiment of the invention.

FIG. 4 is an illustration of a meta data table, according to an embodiment of the invention. As used herein, table refers broadly to a collection of data for ready reference. The meta data table illustrated in FIG. 4 may be a representation of a portion of the meta data 330 illustrated in FIG. 3. As shown in FIG. 4, a meta data table may include multiple bits, where each of the multiple bits may be referenced by bit number integer in row 405. In an embodiment of the invention, there may be a portion of a meta data table associated with each portion of a logical volume. Each portion of the meta data table may be sized to include 16 bytes (128 bits) of data for each corresponding portion of a logical volume. As shown in FIG. 4, the meta data table may include digital data indicated by 1's and 0's in row 410. Row 415 indicates application designations for each bit of the meta data. In the illustrated embodiment, NWBH identifies bit 0 as a Not Written By Host bit; WP identifies bit 1 as a Write Protect bit; V identifies bit 2 as a Validity bit; C identifies bit 3 as a Cache bit; MM identifies bits 4-7 as Mirror Mask bits; and CRC identifies bits 8-11 as Cyclical Redundancy Checking bits. Use of the NWBH bit is described below with reference to FIGS. 5-8.

Variations to the meta data table illustrated in FIG. 4 are possible. For example, the size of the portion of the logical volume for which there is meta data may vary. For instance, each portion of the logical volume may be 64K bytes (i.e., a track as that term is used herein). Alternatively, each portion of the logical volume may be larger or smaller. Where a logical volume is separated into smaller portions, more meta data will be required. Similarly, where a logical volume is separated into larger portions, less meta data will be required. The selection of the size of the portion of the logical volume is a trade-off between the amount of data needed to record the state of the logical volume and the granularity at which the state is recorded. For another example, the size of the portion of the meta data table corresponding to a portion of a logical volume could be other than 16 bytes, and the type and position of application designations may be different than illustrated in FIG. 4. Moreover, in alternative embodiments, there may be a separate meta data table for each portion of a logical volume.

Figure 5:
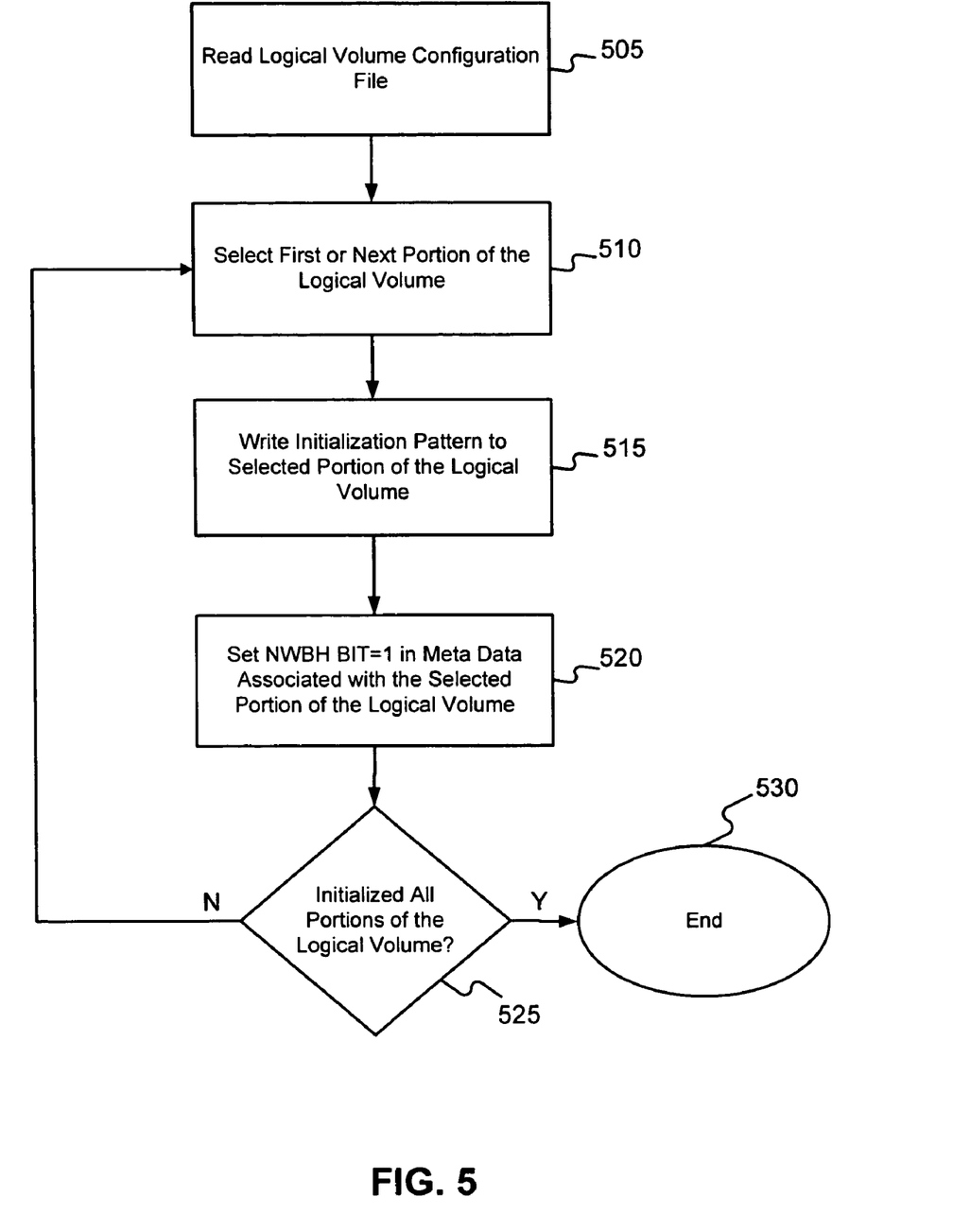
FIG. 5 is a flow diagram of an initialization process for a logical volume, according to an embodiment of the invention.

FIG. 5 is a flow diagram of an initialization process for a logical volume, according to an embodiment of the invention. As shown in FIG. 5, the process begins in step 505 by reading a disk configuration file associated with the logical volume. Next, in step 510, the process selects a first portion of the logical volume. Then, in step 515, the process writes an initialization pattern to the selected portion of the logical volume. In step 520, the process sets a Not Written By Host (NWBH) bit equal to 1, for example in a meta data table associated with the selected portion of the logical volume. In this instance, a 1 indicates that the selected portion has not been written to by a host subsequent to such initialization. In conditional step 525, the process determines whether all portions of the logical volume have been initiated. Where the result of conditional step 525 is in the negative, the process returns to step 510 to select a next portion of the logical volume. Where the result of conditional step 525 is in the affirmative, the process terminates in step 530. Accordingly, the process illustrated in FIG. 5 initializes data in the logical volume and also sets the NWBH bit in metadata for each portion of the logical volume. The process illustrated in FIG. 5 could be repeated for one or more logical volumes in a data storage system.

Variations to the method illustrated in FIG. 5 are possible. For example, in an alternative embodiment, initialization step 515 may not be required.

Figure 6:
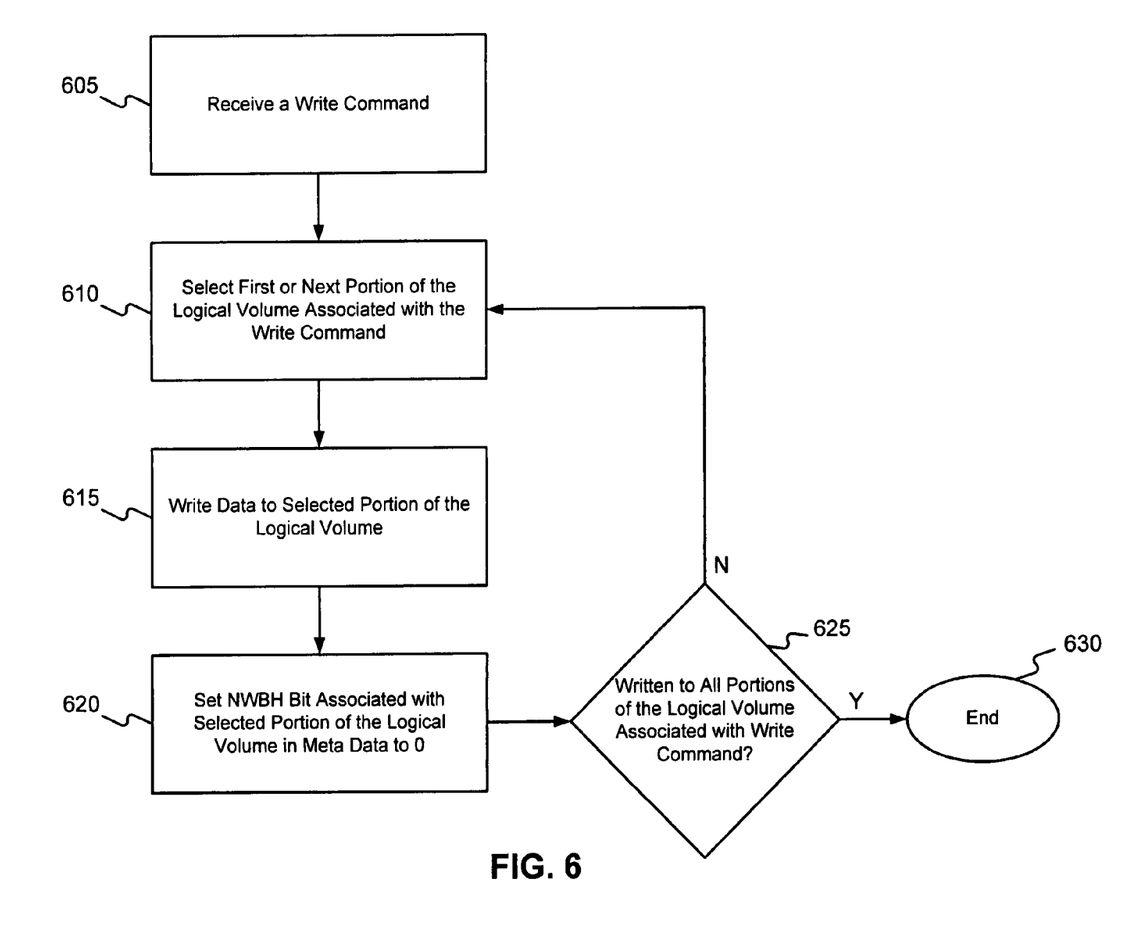
FIG. 6 is a flow diagram of a write process for a logical volume, according to an embodiment of the invention.

FIG. 6 is a flow diagram of a write process for a logical volume, according to an embodiment of the invention. As illustrated therein, the process begins in step 605 by receiving a write command. Next, in step 610, the process selects a portion of the logical volume associated with the write command. Then, in step 615, the process writes data to the selected portion. Next, in step 620, the process sets a NWBH bit in a meta data table associated with the selected portion to zero, indicating that a host has written data to the selected portion of the logical volume. Alternatively, the order of steps 615 and 620 could be reversed. Then, in conditional step 625, the process determines whether all portions of the logical volume associated with the write command have been written. Where the result of conditional step 625 is in the negative, the process returns to step 610 to select a next portion of the logical volume associated with the write command. Where the result of conditional step 625 is in the affirmative, the process terminates in step 630. Accordingly, execution of the method illustrated in FIG. 6 sets a NWBH bit to 0 for each portion of the logical volume that is written by a host.

Figure 7:
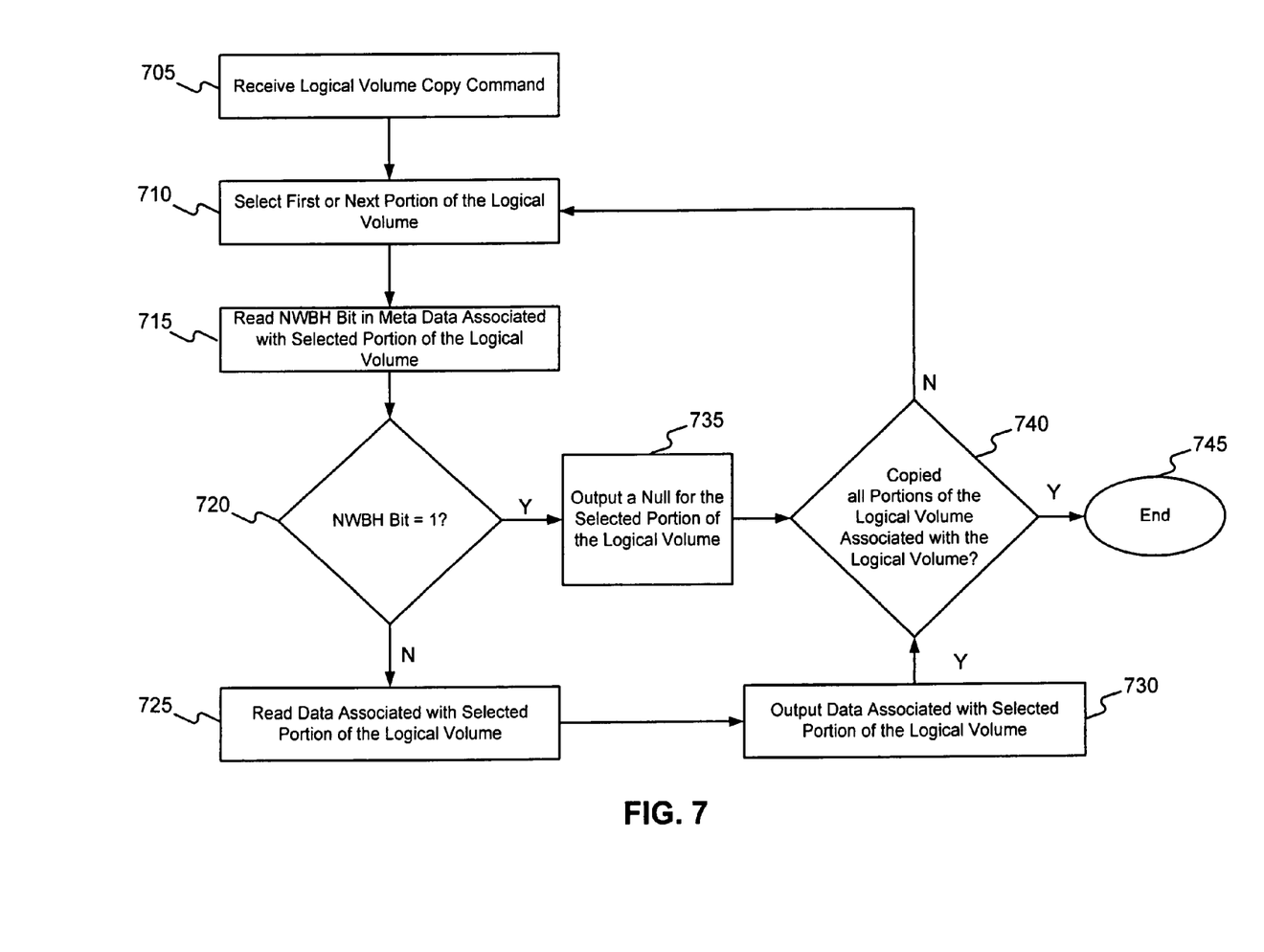
FIG. 7 is a flow diagram of a logical volume copy process, according to an embodiment of the invention.

FIG. 7 is a flow diagram of a logical volume copy process, according to an embodiment of the invention. As illustrated therein, the process begins in step 705 by receiving a logical volume copy command. Next, in step 710, the process selects a first portion of the logical volume. Then, in step 715, the process reads a NWBH bit in a meta data table associated with the selected portion of the logical volume. Next, in conditional step 720, the process determines whether the NWBH bit for the selected portion is equal to 1. Where the result of conditional step 720 is in the negative, the process advances to step 725 to read data associated with the selected portion from the logical volume. Then, in step 730, the process outputs data associated with the selected portion to cache, for example, or to the copy destination.

Where the result of conditional step 720 is in the affirmative, the process advances to step 735 to output a null for the portion of the selected volume to a copy destination. The null indicates that no data is associated with the selected portion of the logical volume. In an alternative embodiment, a NWBH bit associated with the copy destination is marked in step 735. In conditional step 740 (subsequent to either step 730 or step 735), the process determines whether all portions of the logical volume have been copied. Where the result of conditional step 740 is in the negative, the process returns to step 710 to select a next portion of the logical volume. Where the result of conditional step 740 is in the affirmative, the process terminates in step 745.

Accordingly, the logical volume copy method illustrated in FIG. 7 eliminates the need to read portions of a logical volume that have never been written by the host. The process illustrated in FIG. 7 could be repeated for one or more volumes in a data storage system.

Figure 8:
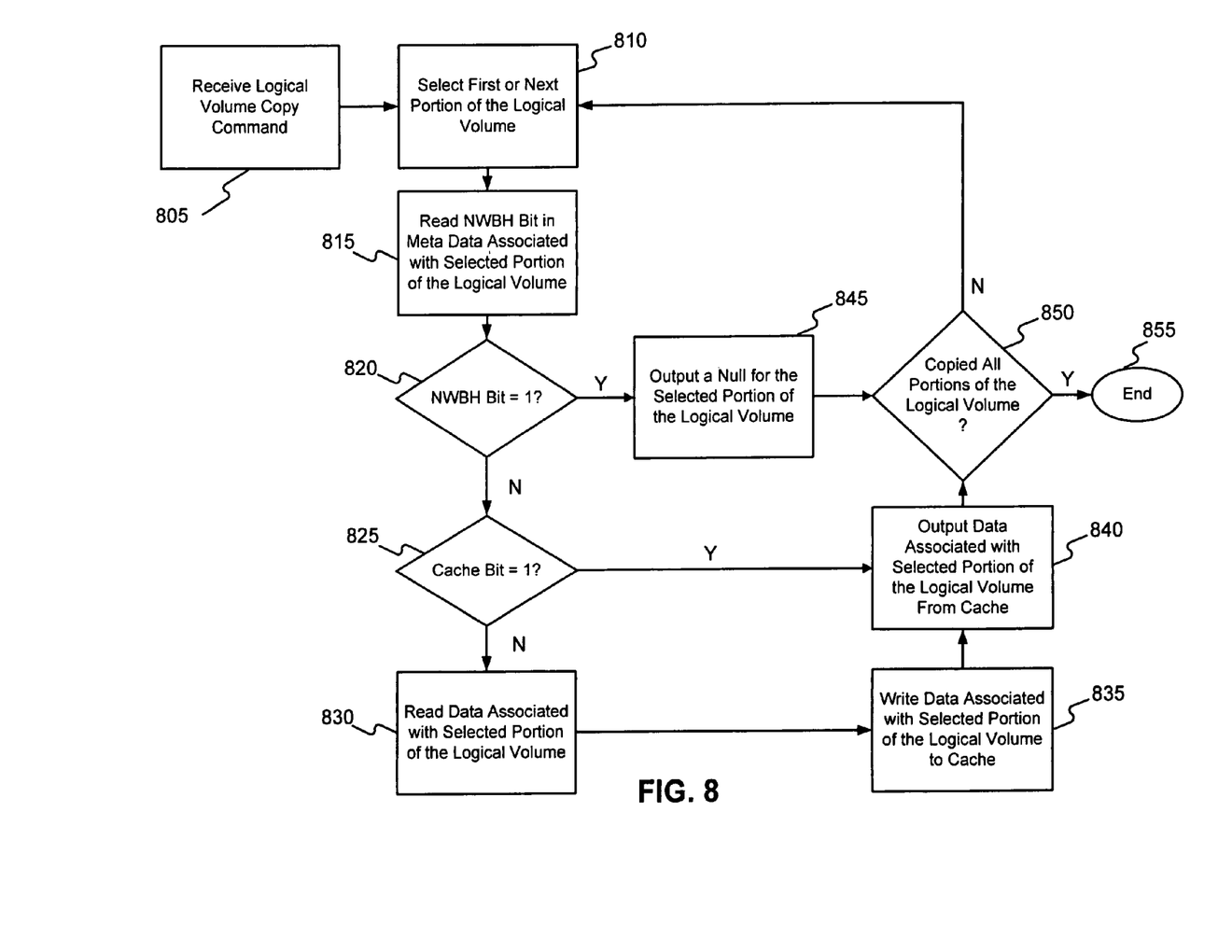
FIG. 8 is a flow diagram of a logical volume copy process, according to an embodiment of the invention.

FIG. 8 is a flow diagram of a logical volume copy process, according to an embodiment of the invention. As shown therein, the process begins in step 805 by receiving a logical volume copy command. Next, in step 810, the process selects a first portion of the logical volume. Then, in step 815, the process reads an NWBH bit in the meta data associated with the selected portion. Next, in conditional step 820, the process determines whether the NWBH bit associated with the selected portion is equal to 1. Where the result of the conditional step 820 is in the negative, the process is promoted to conditional step 825 to determine whether a cache bit is equal to 1. Where the result of conditional step 825 is in the negative, the process advances to step 830 to read data associated with the selected portion of the logical volume. Step 830 may include, for instance, reading data from a disk. Subsequent to step 830, the process advances to step 835 to write data associated with the selected portion of the logical volume to the cache. In step 840, the process outputs data associated with the selected portion of the logical volume from cache to a copy destination. Then, subsequent to step 840, the process advances to conditional step 850 to determine whether all portions of the logical volume have been copied.

Where the result of conditional step 820 is in the affirmative, the process advances to step 845 to output a null for the selected portion of the logical volume to the copy destination. The null indicates that no data is available for the selected portion of the logical volume. In an alternative embodiment, a NWBH bit associated with the copy destination is marked in step 845. After step 845, the process advances to conditional step 850. Where the result of conditional step 825 is in the affirmative, the process advances to step 840. Where the result of conditional step 850 is in the negative, the process returns to step 810 to select a next portion of the logical volume. Where the result of conditional step 850 is in the affirmative, the process terminates in step 855.

Accordingly, the method illustrated in FIG. 8 eliminates the need to read portions of logical volumes that have never been written by the host, and reads from cache whenever data associated with the selected portion exists in cache memory. The process illustrated in FIG. 8 could be repeated for one or more logical volumes in a data storage system.

Figure 9:
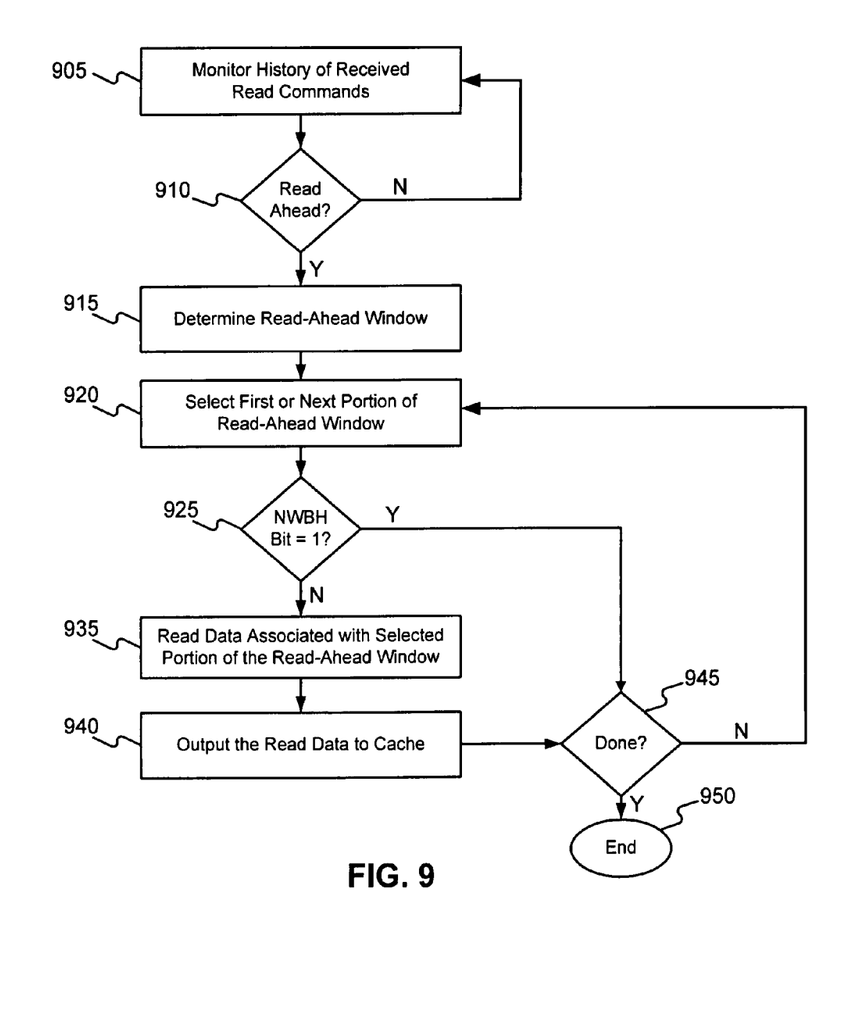
FIG. 9 is a flow diagram of a read-ahead process for a logical volume, according to an embodiment of the invention.

FIG. 9 is a flow diagram of a read-ahead (or pre-fetch) process for a logical volume, according to an embodiment of the invention. As shown in FIG. 9, the process may begin by monitoring a history of received read commands in step 905.

Then, in conditional step 910, the process determines whether to perform (or launch) read-ahead processing. Conditional step 910 may be informed by data associated with step 905. For instance, the process may determine that the read-ahead processing should be performed where the history of reads are sequential, and where a number of sequential reads is greater than a predetermined sequential-read threshold. Moreover, conditional step 910 may be based at least in part on an amount of cache that is available to store data to be read from the logical volume during read-ahead processing. Where the result of conditional step 910 is in the negative, the process returns to monitoring step 905.

Where the result of conditional step 910 is in the affirmative, the process determines a read-ahead window in step 915. A read-ahead window describes a size of logical or physical memory to be read in advance of anticipated receipt of a read command. Step 915 may simply utilize a predetermined read-ahead window. Alternatively, step 915 may determine a read-ahead window based on an amount of cache that is available, a typical size of logical or physical memory associated with a read command, a predetermined minimum read-ahead window, a predetermined maximum read-ahead window, and/or other factors.

Next, in step 920, the process selects a first portion of the read-ahead window. The first portion of the read-ahead window may correspond to one of multiple tracks associated with the read-ahead window, for instance. Then, in step conditional step 925, the process determines whether a NWBH meta data bit associated with the first portion of the read-ahead window is equal to 1. Where the result of conditional step 925 is in the negative, the process reads data associated with the selected portion of the read-ahead window in step 935, then outputs the read data to cache in step 940.

Where the result of conditional step 925 is in the affirmative, the process advances to conditional step 945 to determine whether the process should terminate. The process should terminate, for example, when all portions of the read-ahead window have been selected in step 920 and considered in conditional step 925. Where the result of conditional step 945 is in the negative, the process returns to step 920 to select a next portion of the read-ahead window; where the result of conditional step 945 is in the affirmative, the process terminates in step 950.

Variations to the process illustrated in FIG. 9 are possible. For example, in alternative embodiments, an affirmative result in conditional step 925 would terminate the read-ahead process.

Accordingly, the process illustrated in FIG. 9 exploits the NWBH bit in meta data to expedite a read-ahead process: where a portion of memory associated with a portion of a read-ahead window has not been written by the host, the read-ahead process avoids reading step 935 and caching step 940.

Alternatively, the effect and significance of the NWBH bit being 1 in the foregoing description could be the reverse. For example, the NWBH bit being equal to 0 could indicate that the corresponding portion of the logical volume had never been written a host. In that case, the NWBH bit for a portion of a logical volume would be set to 0 when initializing the logical volume.

Features and principles of the present invention may be implemented by processor-executable code that is stored in processor-readable medium (e.g., floppy disk, CD-ROM, storage device, etc.). For example, each of the methods illustrated in FIGS. 5-9 could be implemented by processor-executable code stored in random access memory (RAM) of a disk adapter for execution by a processor associated with the disk adapter. In other embodiments of the invention, processor-readable medium, code, and/or processors may be distributed throughout a network to execute one or more disclosed methods.

A system, for example as described with reference to FIGS. 2 and/or 3, may be configured to implement any one or more of the processes described with reference to FIGS. 5-9. Moreover, the functional components of the system may be implemented in hardware, software, or a combination of hardware and software, according to design choice.

The embodiments and aspects of the invention set forth above are only exemplary and explanatory. They are not restrictive of the invention as claimed. Other embodiments consistent with features and principles are included in the scope of the present invention. Although embodiments of the invention have been described with reference to logical volumes and portions of logical volumes, features of the invention may be practiced with alternative logical or physical data groupings and hierarchies. As the following sample claims reflect, inventive aspects may lie in fewer than all features of a single foregoing disclosed embodiment. Moreover, features disclosed in one or more embodiments could be used in combinations not expressly described. Thus, the following claims are hereby incorporated into this description, with each claim standing on its own as a separate embodiment of the invention.

What is claimed is:

1. A method for copying a logical volume, comprising:
providing a meta data table for the logical volume, wherein the meta data table identifies whether a host has written data to the logical volume using meta data bits;
receiving a logical volume copy command;
selecting a portion of the logical volume associated with the logical volume copy command;
determining whether a first bit of meta data in the meta data table is in a first predetermined state, the first bit associated with the selected portion, the first predetermined state indicating that the host has not written data to the selected portion of the logical volume; and
outputting an indicator indicating that the host has not written data to the selected portion of the logical volume if the first bit is in the first predetermined state, wherein the indicator causes a first operation in response to the logical volume copy command that is different from a second operation performed in response to the logical volume copy command if no indicator is output.

2. The method of claim 1, wherein, if the first bit is in the first predetermined state, outputting a null, as the indicator, that indicates that no data is associated with the selected portion of the logical volume and which causes the logical volume copy command to be terminated for the selected portion of the logical volume as the first operation.

3. The method of claim 2, wherein, if the first bit is not in the first predetermined state and no indicator is output, performing an operation of reading data associated with the selected portion of the logical volume as the second operation.

4. The method of claim 3 further comprising outputting the data associated with the selected portion of the logical volume subsequent to the reading.

5. The method of claim 1 wherein the logical volume includes a disk.

6. The method of claim 1 wherein the portion of the logical volume includes a track.

7. The method according to claim 1, further comprising:
prior to receiving the logical volume copy command, initializing the meta data table to allow an identification of whether the host has written data to the logical volume subsequent to the initializing.

8. A method for copying a logical volume, comprising:
providing a meta data table for the logical volume, wherein the meta data table identifies whether a host has written data to the logical volume using meta data bits;
receiving a logical volume copy command;
selecting a portion of the logical volume associated with the logical volume copy command;
determining whether a first bit of meta data in the meta data table is in a first predetermined state, the first bit associated with the selected portion, the first predetermined state indicating that the host has not written data to the selected portion of the logical volume; and
if the first bit is not in the first predetermined state, determining whether a second bit in a meta data table is in a second predetermined state, the second bit associated with the selected portion, the second predetermined state indicating that data associated with the selected portion resides in a cache.

9. The method of claim 8 further comprising, if the second bit is in the second predetermined state, outputting data associated with the selected portion of the logical volume from the cache.

10. The method of claim 8 further comprising, if the second bit is not in the second predetermined state, reading data associated with the selected portion of the logical volume.

11. The method of claim 10 further comprising:
writing the data associated with the selected portion of the logical volume to the cache; and
outputting the data associated with the selected portion of the logical volume from the cache to a destination associated with the logical volume copy command.

12. The method according to claim 8, further comprising:
prior to receiving the logical volume copy command, initializing the meta data table to allow an identification of whether the host has written data to the logical volume subsequent to the initializing.

13. A method for read-ahead processing, comprising:
providing a meta data table for a logical volume, wherein the meta data table identifies whether a host has written data to the logical volume using meta data bits;
receiving a command for a read-ahead window of the logical volume;
selecting a first portion of the read-ahead window, the read-ahead window describing a memory portion of the logical volume;
determining whether a meta data bit in the meta data table is in a predetermined state, the meta data bit being associated with the selected first portion of the read-ahead window, and the predetermined state indicating that the host has not written data to the selected first portion of the read-ahead window; and
if the meta data bit is in the predetermined state, outputting an indicator indicating that the host has not written data to the selected first portion of the read-ahead window and selecting a second portion of the read-ahead window, wherein the indicator causes a first operation in response to the command for the read-ahead window that is different from a second operation performed in response to the command if no indicator is output.

14. The method of claim 13, wherein selecting the second portion of the read-ahead window includes selecting a second portion of the read-ahead window that is immediately adjacent to the first portion of the read-ahead window.

15. The method of claim 13 further comprising determining the read-ahead window based at least in part on an amount of available cache.

16. The method of claim 13, further comprising, if the meta data bit is not in the predetermined state:
reading the data associated with the selected first portion of the read-ahead window; and
outputting the read data to a cache.

17. The method of claim 13 further comprising:
monitoring a history of received read commands; and
determining whether to launch a read-ahead process.

18. The method of claim 17 wherein the determining whether to launch a read-ahead process is based at least in part on the history having sequential reads, a number of the sequential reads being greater than a predetermined sequential-read threshold.

19. The method of claim 17 wherein the determining whether to launch a read-ahead process is based at least in part on an amount of available cache.

20. The method of claim 17 further comprising determining the read-ahead window, the determining the read-ahead window associated with one of setting logical and physical boundaries.

21. The method of claim 20, the determining the read-ahead window based at least in part on an amount of available cache.

22. The method according to claim 13, further comprising:
prior to receiving the logical volume copy command, initializing the meta data table to allow an identification of whether the host has written data to the logical volume subsequent to the initializing.

23. A system configured to copy a logical volume comprising:
a meta data table that is provided for the logical volume, wherein the meta data table identifies whether a host has written data to the logical volume using meta data bits;
a receiver configured to receive a logical volume copy command;
a selector configured to select a portion of the logical volume associated with the logical volume copy command;
a resolver configured to determine whether a first bit of meta data in the meta data table is in a first predetermined state, the first bit associated with the selected portion, the first predetermined state indicating that the host has not written data to the selected portion of the logical volume; and
an output stage configured to output an indicator indicating that the host has not written data to the selected portion of the logical volume if the first bit is in the first predetermined state, wherein the indicator causes a first operation in response to the logical volume copy command that is different from a second operation performed in response to the logical volume copy command if no indicator is output.

24. The system according to claim 23, wherein the meta data table is initialized prior to receiving the logical volume copy command allowing an identification of whether the host has written data to the logical volume subsequent to the initializing.

* * * * *